(12) United States Patent
Archer

(10) Patent No.: US 9,219,939 B1
(45) Date of Patent: *Dec. 22, 2015

(54) METHODS AND DEVICES FOR PRESENTING AN INTERACTIVE MEDIA GUIDANCE APPLICATION

(71) Applicant: United Video Properties, Inc., Santa Clara, CA (US)

(72) Inventor: Kuan Hidalgo Archer, Glendale, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/162,616

(22) Filed: Jan. 23, 2014

Related U.S. Application Data

(63) Continuation of application No. 13/618,840, filed on Sep. 14, 2012, now Pat. No. 8,667,538, which is a continuation of application No. 12/177,790, filed on Jul. 22, 2008, now Pat. No. 8,327,402.

(60) Provisional application No. 61/080,777, filed on Jul. 15, 2008.

(51) Int. Cl.
*H04N 5/445* (2011.01)
*H04N 21/433* (2011.01)
*H04N 21/44* (2011.01)
*H04N 21/472* (2011.01)

(52) U.S. Cl.
CPC ..... *H04N 21/4331* (2013.01); *H04N 21/44004* (2013.01); *H04N 21/47205* (2013.01); *H04N 21/47214* (2013.01)

(58) Field of Classification Search
CPC ...................................... H04N 5/445
USPC ........................... 725/46, 50, 86, 94
See application file for complete search history.

(56) References Cited

U.S. PATENT DOCUMENTS 8,327,402 B1 * 12/2012 Archer ............................ 725/50

* cited by examiner

*Primary Examiner* — Kieu Oanh T Bui
(74) *Attorney, Agent, or Firm* — Ropes & Gray LLP

(57) ABSTRACT

Methods and devices for presenting an interactive media guidance application are provided in accordance with various embodiments. In some embodiments, the methods comprise: determining that a first portion of guide listings corresponding to guidance information for a first amount of time has been displayed on the user equipment device; automatically requesting a second portion of guide listings corresponding to guidance information for a second amount of time from a database having guidance information in response to determining that the first portion of guide listings has been displayed, wherein the second amount of time succeeds the first amount of time in time order and wherein the second portion of guide listings is stored in a cache located between the database and the user equipment device; receiving an indication that a user has requested at least one guide listing within the second portion of guide listings; and receiving the second portion of guide listings from the cache in response to receiving the indication from the user.

20 Claims, 7 Drawing Sheets

… (1) …

METHODS AND DEVICES FOR PRESENTING AN INTERACTIVE MEDIA GUIDANCE APPLICATION

CROSS-REFERENCE TO RELATED APPLICATION

This patent application is a continuation of prior U.S. patent application Ser. No. 13/618,840 (currently pending), filed Sep. 14, 2012, which claims the benefit of U.S. patent application Ser. No. 12/177,790, filed Jul. 22, 2008 (now U.S. Pat. No. 8,327,402), which claims the benefit of U.S. Provisional Application No. 61/080,777, filed Jul. 15, 2008, the disclosures of which are hereby incorporated by reference herein in their entirety.

BACKGROUND OF THE INVENTION

Due to the overwhelming volume of media content (e.g., television shows) available to the average person (e.g., via cable or satellite television), interactive media guidance applications, such as interactive program guides, have gained widespread popularity. Typically, these guidance applications present guide listings in a two-dimensional grid indexed by time and source (e.g., a television channel).

When a user initiates the guidance application, the guidance application presents the user with guide listings corresponding to particular sources and particular times. When the user attempts to view guide listings for a time period outside of the time period that is currently represented in the guidance application, the guidance application requests and/or retrieves guide listings and other guidance data from a remote database. However, because of the latency of this retrieval of guide listings and guidance data, scrolling through available program can be time-consuming and frustrating for the user.

Accordingly, there exists a need for mechanisms that overcome these and other deficiencies in prior art systems.

SUMMARY OF THE INVENTION

Methods and devices for presenting an interactive media guidance application are provided in accordance with various embodiments of the present invention. In some embodiments, methods for presenting an interactive media guidance application in a user equipment device are provided, the methods comprising: determining that a first portion of guide listings corresponding to guidance information for a first amount of time has been displayed on the user equipment device; automatically requesting a second portion of guide listings corresponding to guidance information for a second amount of time from a database having guidance information in response to determining that the first portion of guide listings has been displayed, wherein the second amount of time succeeds the first amount of time in time order and wherein the second portion of guide listings is stored in a cache located between the database and the user equipment device; receiving an indication that a user has requested at least one guide listing within the second portion of guide listings; and providing the second portion of guide listings from the cache in response to receiving the indication from the user.

In some embodiments, devices for presenting an interactive media guidance application are provided, the devices comprising: processing circuitry that: determines that a first portion of guide listings corresponding to guidance information for a first amount of time has been displayed on the user equipment device; automatically requests a second portion of guide listings corresponding to guidance information for a second amount of time from a database having guidance information in response to determining that the first portion of guide listings has been displayed, wherein the second amount of time succeeds the first amount of time in time order and wherein the second portion of guide listings is stored in a cache located between the database and the user equipment device; receives an indication that a user has requested at least one guide listing within the second portion of guide listings; and provides the second portion of guide listings from the cache in response to receiving the indication from the user.

In some embodiments, devices for presenting an interactive media guidance application are provided, the devices comprising: means for determining that a first portion of guide listings corresponding to guidance information for a first amount of time has been displayed on the user equipment device; means for automatically requesting a second portion of guide listings corresponding to guidance information for a second amount of time from a database having guidance information in response to determining that the first portion of guide listings has been displayed, wherein the second amount of time succeeds the first amount of time in time order and wherein the second portion of guide listings is stored in a cache located between the database and the user equipment device; means for receiving an indication that a user has requested at least one guide listing within the second portion of guide listings; and means for providing the second portion of guide listings from the cache in response to receiving the indication from the user.

DETAILED DESCRIPTION OF VARIOUS EMBODIMENTS

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content (which may be referred to herein as "programs" or "programming") including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications may also allow users to navigate among and locate content related to the video content including, for example, video clips, articles, advertisements, chat sessions, games, etc.

With the advent of the Internet, mobile computing, and high-speed wireless networks, users are accessing media on personal computers (PCs) and other devices on which they traditionally did not, such as hand-held computers, personal digital assistants (PDAs), mobile telephones, vehicle entertainment systems, or other mobile devices. On these devices, users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

Figure 1:
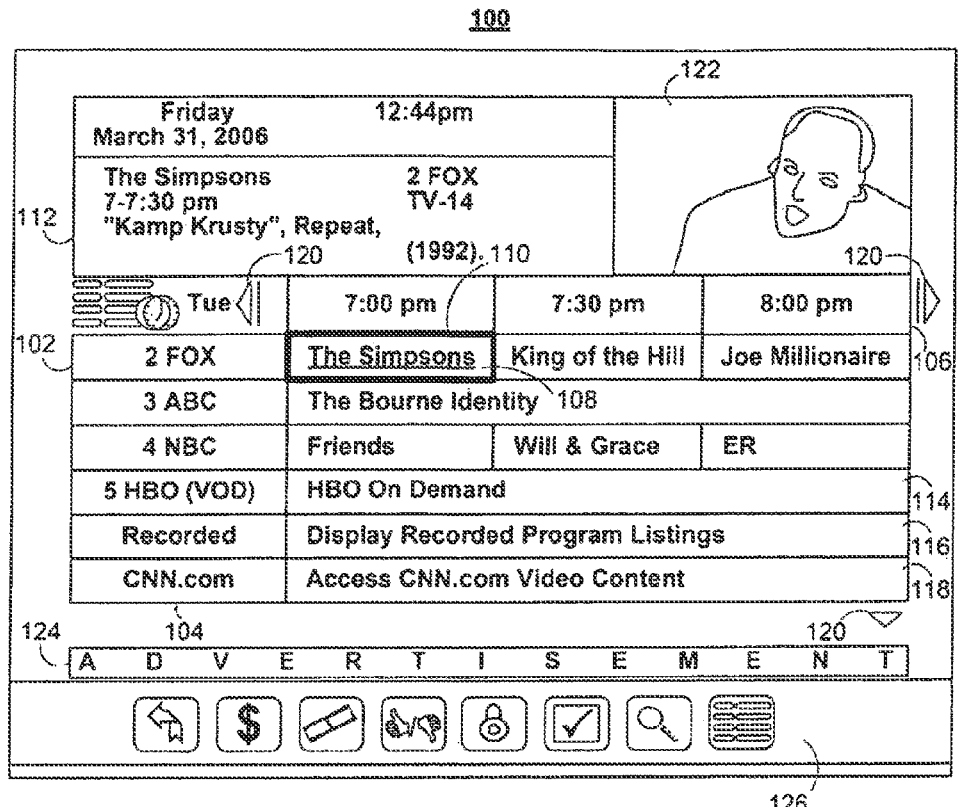
FIG. 1 illustrates an example of a grid display in an interactive media guidance application in accordance with some embodiments of the present invention.
Figure 2:
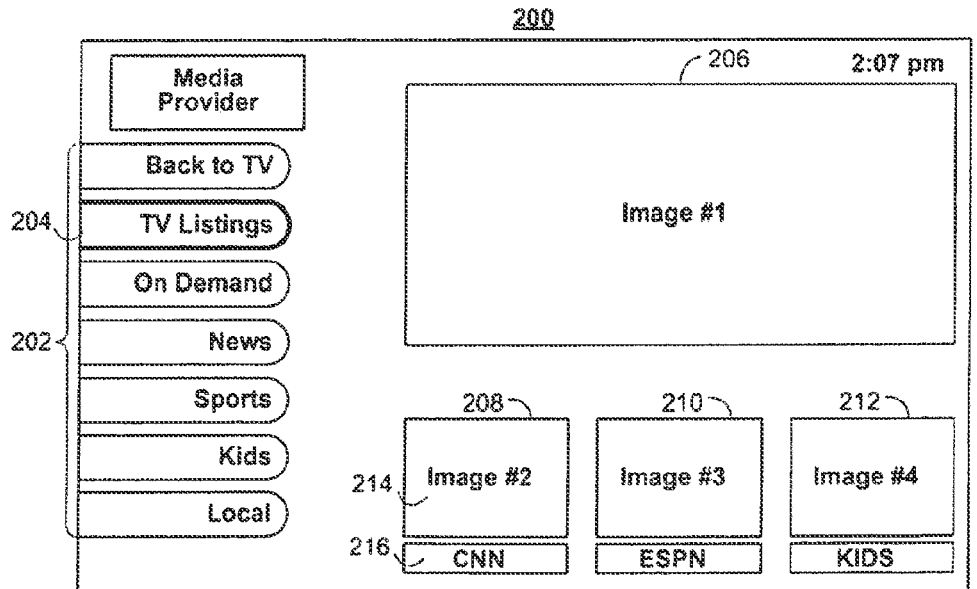
FIG. 2 illustrates an example of a mosaic display in an interactive media guidance application in accordance with some embodiments of the present invention.
Figure 9:
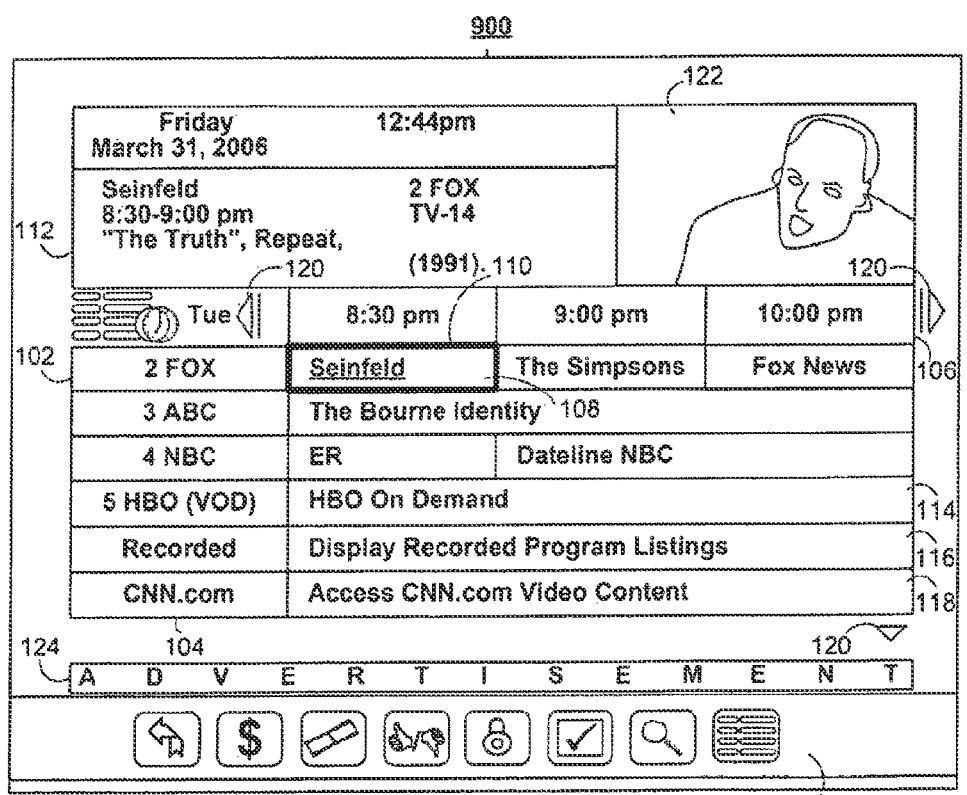
FIG. 9 illustrates an example of a grid display with updated media guidance application data in an interactive media guidance application in accordance with some embodiments of the present invention.

One of the functions of the media guidance application is to provide media listings and media information to users. FIGS. 1-2 show illustrative display screens that may be used to provide media guidance, and in particular media listings. The display screens shown in FIGS. 1, 2, and 9 may be implemented on any suitable device or platform. While the displays of FIGS. 1, 2, and 9 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, a media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, a media guidance application may also provide access to non-linear programming which is not provided according to a schedule. Non-linear programming may include content from different media sources including on-demand media content (e.g., video-on-demand (VOD)), Internet content (e.g., streaming media, downloadable media, etc.), locally stored media content (e.g., video content stored on a digital video recorder (DVR), digital video/versatile disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND, THE SOPRANOS, and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g., FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed may be based on user selection or guidance application definition (e.g., a display of only recorded and broadcast listings, only on-demand and broadcast listings, etc.), and any suitable permutation may be used. As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. Patent Application Publication No. 2003/0110499 A1, published Jun. 12, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting a program and/or channel as a favorite, purchasing a program, or other features. Options available from a main menu display may include search options, VOD options, parental control options, options to access various types of listing displays, options to subscribe to a premium service, options to edit a user's profile, options to access a browse overlay, or other options.

The media guidance application may be personalized based on a user's preferences. A personalized media guidance application may allow a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. Patent Application Publication No. 2005/0251827 A1, published Nov. 10, 2005, Boyer et al., U.S. Pat. No. 7,165,098, issued Jan. 16, 2007, and Ellis et al., U.S. Patent Application Publication No. 2002/0174430 A1, published Nov. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. The listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are illustrated as being of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
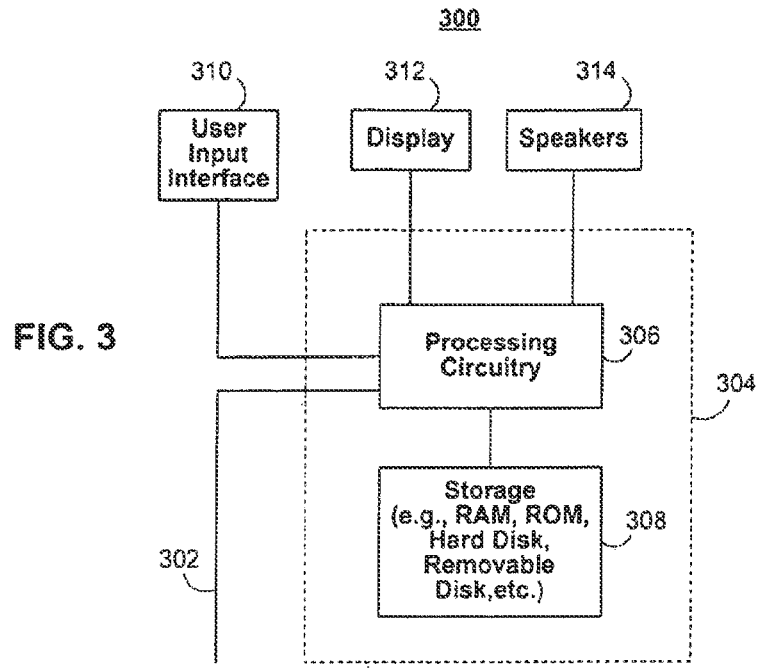
FIG. 3 illustrates an example of user equipment devices that may be used to implement an interactive media guidance application in accordance with some embodiments of the present invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, a wireless modem for communications with other equipment, a fiber-optic communications interface, a network interface (e.g., for an Ethernet network), and/or any other suitable interface. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Non-volatile memory may also be used (e.g., to launch a boot-up routine and other instructions).

In some embodiments, storage 308 may also include a cache. The cache may be any suitable mechanism for retrieving and/or storing guidance information and guidance application data from a media guidance data source 418 (FIG. 4) or any other suitable media guidance data source. For example, the cache may be a flat file database, a hierarchical database, a database structure used for rapid delivery of data, a database structure that has been tuned for read-only delivery for data, a client-based cache, or any other suitable storage device. In another example, the cache may be a collection of data from media guidance data source 418 or any other suitable media guidance data source that may be rapidly accessed by user equipment devices (e.g., user equipment devices 402, 404, and/or 406).

Referring back to FIG. 3, control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

Figure 4:
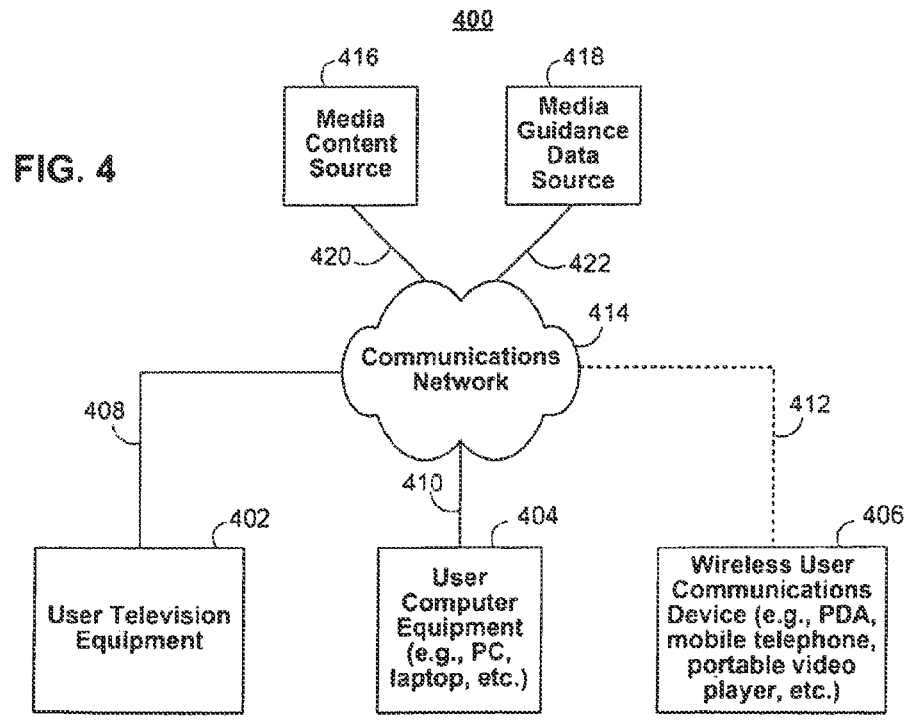
FIGS. 4-6 illustrate examples of a system for implementing an interactive media guidance application in accordance with some embodiments of the present invention.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV (now known as MSN TV) is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIGS. 3A and 3B and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to control, and/or maintain consistent media guidance application settings across, in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel may appear as a favorite on the user's in-home devices (e.g., user television equipment and user computer equipment) as well as the user's mobile devices, if desired. As another example, a user may specify using one device (e.g., a portable device or one mounted in the user's automobile) that a program is to be recorded on another of the user's devices (e.g., the user's home device). Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 may be coupled to communications network 414 via communications paths 408, 410, and 412, respectively. Communications network 414 may be one or more networks including the Internet, a mobile phone network, mobile device (e.g., Blackberry) network, cable network, public switched telephone network, a satellite network (e.g., a satellite television network or other satellite communications network), or other types of communications network or combinations of communications networks. BLACKBERRY is a trademark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a trademark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. Patent Application Publication No. 2003/0149988 A1, published Aug. 7, 2003, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Figure 5:
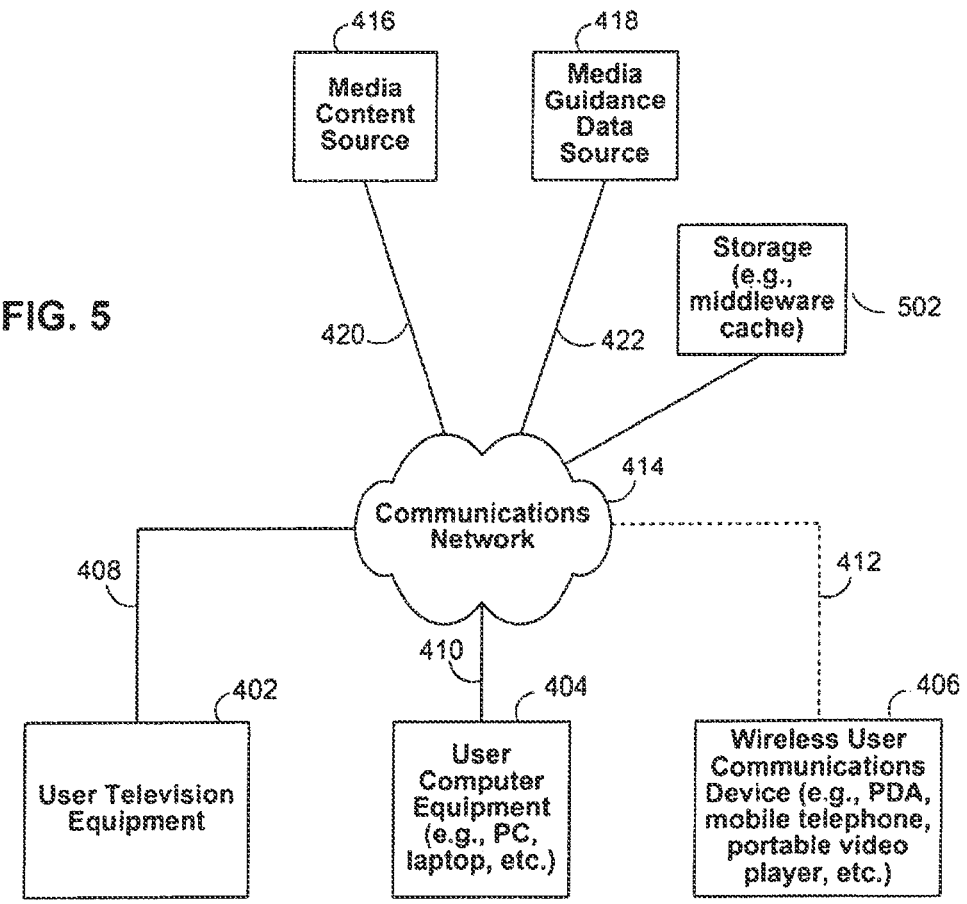

As shown in FIG. 5, in some embodiments, the guidance application may receive updated program guide data, guide listings, and/or any other suitable media guidance application data from a cache 502 through communications network 414. Cache 502 may be any suitable mechanism for retrieving and/or storing guidance information and guidance application data from a media guidance data source 418 or any other suitable media guidance data source. For example, cache 502 may be a flat file database, a hierarchical database, a database structure used for rapid delivery of data, a database structure that has been tuned for read-only delivery for data, a client-based cache, or any other suitable storage device. In another example, cache 502 may be a collection of data from media guidance data source 418 or any other suitable media guidance data source that may be rapidly accessed by user equipment devices (e.g., user equipment devices 402, 404, and/or 406).

As illustrated in FIG. 5, cache 502 may be a middleware cache or a middle-tier cache that obtains particular guidance application data from media guidance data source 418 to provide to the guidance application on user equipment devices 402, 404, or 406. For example, cache 502 may be located between a database of media guidance application data (e.g., media guidance data source 418) and the user equipment devices (e.g., user equipment devices 402, 404, and/or 406). Alternatively, cache 502 may be coupled to media guidance data source 418 using any suitable mechanism, such as a USB cable, an IEEE 1394 cable, a wireless path (e.g., Bluetooth, infrared, IEEE 802-11x, etc.), or another form of short-range communications via a wired or wireless path.

Figure 6:
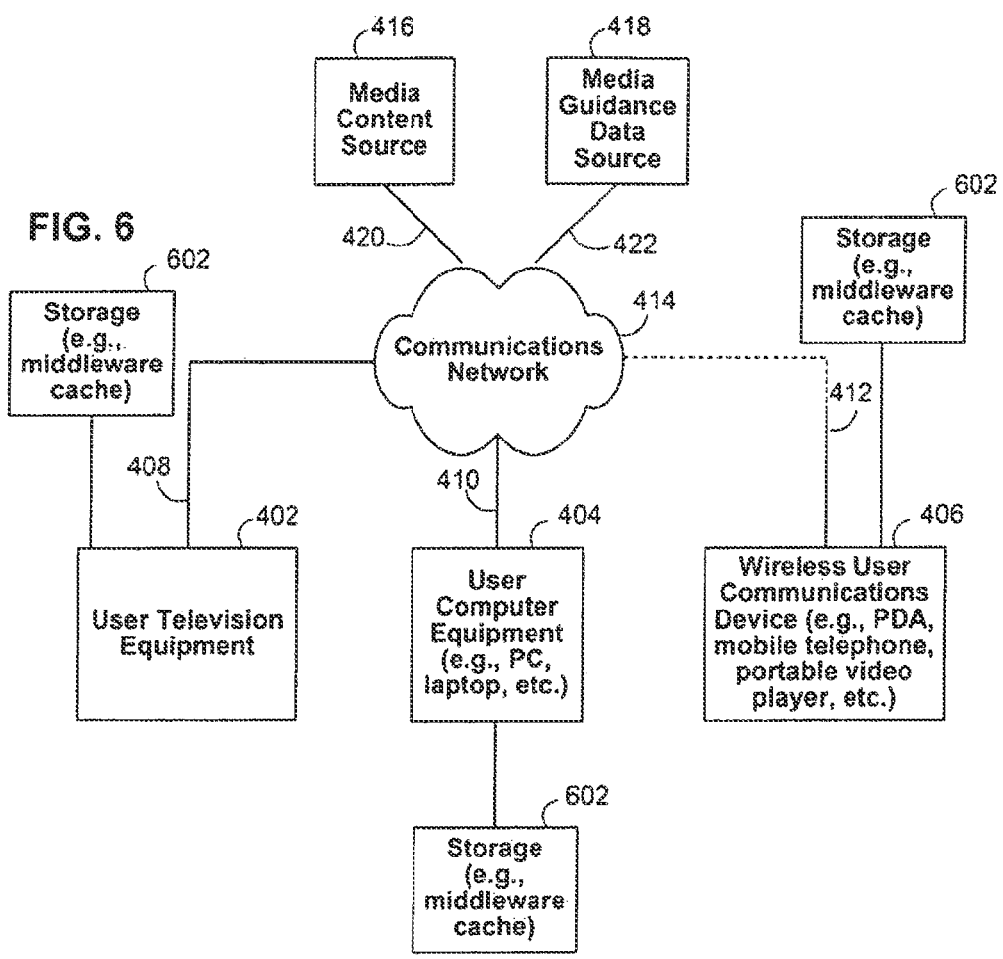

In some embodiments, as illustrated in FIG. 6, user equipment devices 402, 404, and/or 406 may be coupled to cache 602. Cache 602 may be substantially the same as cache 502, described above in connection with FIG. 5. In some embodiments, cache 602 may be part of another system. For example, cache 602 may be part of user computer equipment 404, where cache 602 provides updated media guidance application data to the guidance application on user television equipment 402. Cache 602 may be coupled to user equipment devices 402, 404, or 406 using any suitable mechanism, such as a USB cable, an IEEE 1394 cable, a wireless path (e.g., Bluetooth, infrared, IEEE 802-11x, etc.), or another form of short-range communications via a wired or wireless path.

In some embodiments, cache 502 and/or cache 602 may monitor the guidance application. For example, cache 502 and/or cache 602 may immediately provide guidance application data in response to the interactions the user has with the guidance application. In response to providing the guidance application data to the guidance application, cache 502 and/or cache 602 may request and/or retrieve additional guidance application data from media guidance data source 418. In another example, cache 502 and/or cache 602 may determine whether the appropriate guidance application data has been retrieved from media guidance data source 418 based on the interactions the user has with the guidance application. In yet another example, cache 502 and/or cache 602 may receive instructions from one of the user equipment devices 402, 404, or 406 regarding retrieving media guidance application data from media guidance data source 418.

It should be noted that cache 502 and/or cache 602 may store any suitable amount of media guidance application data. For example, cache 502 and/or cache 602 may store media guidance application data corresponding to a predetermined amount of time (e.g., the next three hours of media listings, the next five hours of media listings, one day of media listings, five days of media listings, etc.). In another example, cache 502 and/or cache 602 may store media guidance application data until the cache has reached its storage capacity (e.g., one terabyte of media listings). In yet another example, cache 502 and/or cache 602 may store media guidance application data based on a profile associated with the user equipment device (e.g., the profile indicates that the user of the user equipment device uses the guidance application primarily after 6:00 pm, the profile indicates that the user watched more television on weekends, etc.). In yet another example, cache 502 and/or cache 602 may store media guidance application data based on a profile associated with a neighborhood of user equipment devices.

Media guidance applications may be, for example, standalone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized examples of FIGS. 4-6.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Application Publication No. 2005/0251827 A1, published Nov. 10, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access a media guidance application on a website via a personal computer at their office, on a mobile device such as a PDA or web-enabled mobile telephone, on a vehicle-based system that is part of or coupled to a navigation system, etc. The user may set various settings (e.g., recordings, reminders, or other settings) on the guidance application to control the user's in-home equipment. The guide may control the user's equipment directly, or by communicating with a media guidance application on the user's in-home equipment. Various systems and methods for user equipment devices communicating, where the user equipment devices are in locations remote from each other, are discussed in, for example, Ellis et al., U.S. Patent Application Publication No. 2005/0028208 A1, published Feb. 3, 2005, which is hereby incorporated by reference herein in its entirety.

In a third approach, users of user equipment devices inside and outside a home can use their media guidance application to communicate directly with media content source 416 to access media content. Specifically, within a home, users of user television equipment 402 and user computer equipment 404 may access the media guidance application to navigate among and locate desirable media content. Users may also access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

In some embodiments, the interactive media guidance application presents a user with instantaneous or near-real time media guidance application data (sometimes referred to herein as "media guidance information" or "media guidance data") in a grid display while the user scrolls or advances through guide listings and/or other media guidance application data. For example, the interactive media guidance application allows the user to advance through guide listings in a grid display without experiencing delays from waiting for updated guide listings. An illustrative example of the interactive media guidance application with updated guide listings is shown in FIG. 9.

It should be noted that media guidance application data may include, for example, program information, guide listings, guidance application settings, user preferences or profile information, or other data used in operating the guidance application.

Figure 7:
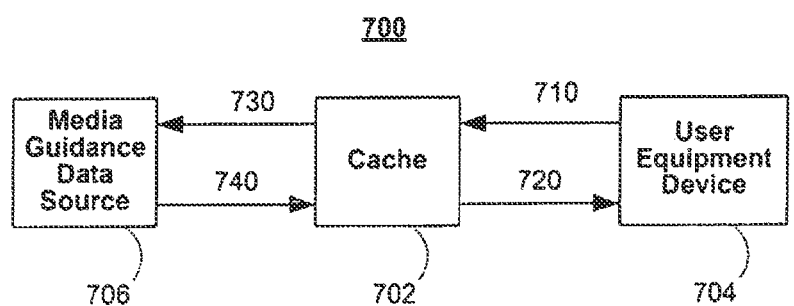
FIG. 7 illustrates an example of a simplified flow diagram showing the transactions between a cache, a user equipment device, and a media guidance data source in accordance with some embodiments of the present invention.

Turning to FIG. 7, a simplified flow diagram 700 showing the transactions between a cache, a user equipment device, and a media guidance data source is illustrated. As shown, in this example, a cache 702 is located between a user equipment device 704 and a media guidance data source 706. Alternatively, as described previously, cache 702 may be connected to or part of user equipment device 704.

In some embodiments, cache 702 may be preloaded with media guidance application data (e.g., guide listings for a particular instance of the grid display) from media guidance data source 706. For example, cache 702 may request media guidance application data based on the current time or based on the local time for the user equipment devices that the cache provides media guidance application.

In response to the interactive media guidance application implemented on user equipment device 704 requesting a first portion of guide listings (e.g., a first page, a first set of guide listings, guide listings for a particular time period, etc.) at step 710, cache 702 may transmit the first portion of guide listings to the user equipment device 704 at step 720. At step 730, cache 702 may automatically request a second portion of guide listings (e.g., a second page, a second set of guide listings, guide listings for a subsequent time period, etc.) from media guidance data source 706. At step 740, cache 702 receives the second portion of guide listings from media guidance data source 706. Accordingly, cache 702 is prepared to transmit the second portion of guide listings to user equipment device 704 in response to, for example, receiving an indication from the user (e.g., the interactions the user has with the interactive media guidance application).

Figure 8:
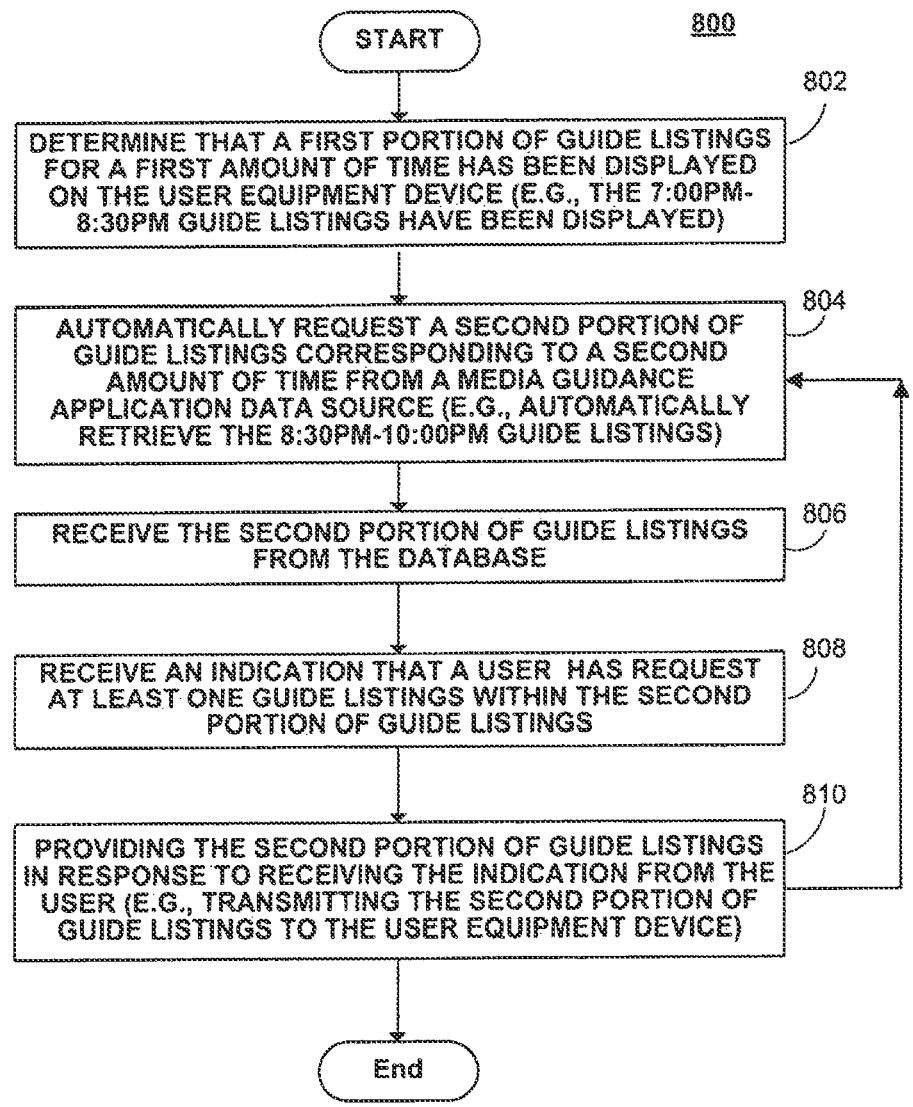
FIG. 8 illustrates an example of a process for delivering guidance data from a cache to an interactive media guidance application in accordance with some embodiments of the present invention.

Turning to FIG. 8, a process 800 that may be used to implement an interactive media guidance application that displays grid program listings displays without latency is illustrated.

In some embodiments, the interactive media guidance application uses a cache that stores portions of media guidance application data from a media guidance data source. The cache may be, for example, a flat file database, a hierarchical database, a database structure used for rapid delivery of data, a database structure that has been tuned for read-only delivery for data, a client-based cache, or any other suitable storage device.

It should be noted that, in some embodiments, the cache may be a middleware cache or a middle-tier cache located between the media guidance data source and the user equipment device (as illustrated in FIG. 7). Alternatively, the cache may be coupled to the user equipment device or the media guidance data source.

In response to the user initiating the interactive media guidance application, the interactive media guidance application presents the user with an illustrative grid program listings display arranged by time and channel that enables access to different types of media content in a single display (see, e.g., FIG. 1). The grid program listings display includes guide listings corresponding to channel/media type identifiers and time identifiers. For example, as shown in FIG. 1, the guide listing corresponding to the channel/media type identifier "2 FOX" and the time identifier "7:00 pm" is identified by the program title "The Simpsons."

As shown in FIG. 8, beginning at step 802, the process 800 may determine that a first portion of guide listings corresponding to a first amount of time has been displayed on the user equipment device. For example, as illustrated in FIG. 1, the cache may determine that the guide listings and any other media guidance application data corresponding to programs occurring between 7:00 PM and 8:30 PM have been displayed on the user equipment device. In response, at step 804, the cache may automatically request that a second portion of guide listings corresponding to a second amount of time be transmitted from the media guidance data source (e.g., media guidance data source 418 of FIG. 4) to the cache. For example, the cache may automatically request that the media guidance data source transmit, for storage in the cache, media guidance application data corresponding to programs occurring between 8:30 PM and 10:00 PM.

It should be noted that, in some embodiments, the cache may retrieve media guidance application data corresponding a particular number of hours (e.g., every two hours of guide listings, every day of guide listings, etc.). Alternatively, the cache may retrieve media guidance application data until the cache has no storage capacity left.

In some embodiments, the cache receives an instruction from the user equipment device (e.g., the interactive media guidance application or any other suitable application that monitors the interactions the user has with the interactive media guidance application) to retrieve a particular number of hours of guide listings and any suitable media guidance application data (n hours of guide listings). In response, the cache may automatically request and/or retrieve the media guidance application data from the media guidance data source. For example, the cache may transmit a query to the media guidance data source, where the query includes, for example, the time period (e.g., 8:30 PM to 10:00 PM), the source, or any other suitable information. In another example, the media guidance data source may determine the previously transmitted media guidance application data and transmit the subsequent media guidance application data.

In some embodiments, the cache may retrieve a given page of guide listings. For example, the cache may determine that a first page (page n) of guide listings has been transmitted and/or displayed on the user equipment device. In response, the cache may automatically request and/or retrieve the next page (page n+1) from the media guidance data source.

In some embodiments, the cache may retrieve media guidance application data corresponding to a profile associated with the user equipment device. For example, in response to the profile indicating that the user primarily watches television in the evenings, the cache may retrieve more media guidance application data between the hours of 6:00 PM and 12:00 AM than for other hours during the day.

In some embodiments, the cache may retrieve media guidance application data from a media guidance data source or any other suitable data source in response to a weight assigned to each portion of guide listings and/or media guidance application data. For example, the cache may assign a higher weight value to media guidance application data between the hours of 6:00 PM and 12:00 AM and a lower weight value to media guidance application data for the other hours of the day. In response to the assigned weight values, the interactive media guidance application may use the cache to preload media guidance application data between the hours of 6:00 PM and 12:00 AM and not use the cache during the other hours of the day. In another example, the cache may assign a higher weight value to media guidance application data that includes particular programs (e.g., favorite programs, recorded programs, programs with reminders, programs that the user often watches, etc.).

Referring back to FIG. 8, at step 806, the cache may receive the second portion of guide listings from the media guidance data source.

In some embodiments, the cache may monitor the interactions that the user has with the interactive media guidance applications (e.g., movements by the user input device, button depressions on a remote control, favorite programs, programs that the user primarily watches, etc.). For example, with a user input device (e.g., a remote control), the user may advance through program listings by moving a highlight region.

At step 808, the cache may receive an indication that a user has requested a guide listing outside of those currently displayed in the grid display. In some embodiments, the indication received by the cache may be an indication that the user has used the user input device to advance to program listings not currently displayed on the grid program listings display. For example, the cache may monitor the location of the highlight region (e.g., highlight region 110) and monitor the button depressions on the user input device. In another example, the cache may monitor the location of the highlight region and monitor the number of times the user has selected one of the navigational icons 120. In response to receiving the indication from the user, the cache may provide the second portion of guide listings to the interactive media guidance application implemented on the user equipment device at step 810.

It should be noted that, in some embodiments, the interactive media guidance application may transmit instructions to the cache based on the interactions that the user has with the interactive media guidance application. For example, in response to the user selecting one of the navigational icons 120, the interactive media guidance application may request that the cache transmit the updated media guidance application data stored in the cache.

The interactive media guidance application may automatically receive the updated media guidance application data from the cache and use the updated media guidance application to present the user with an updated media guidance application. An illustrative example of the interactive media guidance application with updated media guidance application data from the cache is shown in FIG. 9.

As also shown in FIG. 8, the cache may revert back to step 804. In response to providing the second portion of guide listings from the media guidance data source, the cache may automatically request that the media guidance data source or any other suitable data source transmit the next portion of guide listings.

Accordingly, the media guidance application data is received from the cache without requiring that the user equipment device communicate in each instance with the media guidance data source or a back-end database.

Thus, it is seen that methods and systems for presenting a guidance application are provided. One skilled in the art will appreciate that the invention can be practiced by other than the described embodiments, which are presented for purposes of illustration and not of limitation, that various features of the described embodiments can be interchanged and used in any suitable combination, and that the present invention is limited only by the claims which follow.

What is claimed is:

1. A method for caching media asset information for a future time period comprising:
   determining, using control circuitry that is not a transitory medium, during a first time period, that a user is likely to use a user device during a subsequent second time period based on a user profile;
   automatically requesting, using communications circuitry that is not a transitory medium, with a first request, second media asset information for the second time period from a database listing media asset information for a plurality of time periods in response to determining that the user is likely to use the user device during the second time period;
   storing, using storage circuitry that is not a transitory medium, while first media asset information for the first time period is displayed, the requested second media asset information in a cache;
   receiving, using the control circuitry, a second request for the requested second media asset information; and
   retrieving, using the storage circuitry, the requested second media asset information from the cache in response to receiving the second request.

2. The method of claim 1, further comprising requesting, using the communications circuitry, third media asset information for a third time period from the database in response to the requested second media asset information being retrieved, wherein the third time period succeeds the second time period in time order.

3. The method of claim 1, wherein the first media asset information comprises a first media asset identifier, and wherein the second media asset information comprises a second media asset identifier.

4. The method of claim 3, wherein the first media asset identifier is a first program identifier, and wherein the second media asset identifier is a second program identifier.

5. The method of claim 1, further comprising receiving, using the control circuitry, an indication from the user device to retrieve the requested second media asset information.

6. The method of claim 5, wherein the received indication is based on a user selection of a selectable identifier, and wherein the selectable identifier corresponds to a specific media asset identifier corresponding to the second media asset information.

7. The method of claim 5, wherein the received indication is based on the first media asset information being displayed for a threshold period of time.

8. The method of claim 1, wherein the user profile is, at least in part, manually generated.

9. The method of claim 1, wherein the user profile is, at least in part, automatically generated by the control circuitry.

10. The method of claim 1, wherein the user profile reflects times and days that the user is likely to use the user device.

11. A system for caching media asset information for a future time period comprising:
    communications circuitry that is not a transitory medium configured to request information from a database listing media asset information for a plurality of time periods;
    storage circuitry that is not a transitory medium comprising a cache; and
    control circuitry that is not a transitory medium configured to:
      determine, during a first time period, that a user is likely to use a user device during a subsequent second time period based on a user profile;
      automatically request, using the communications circuitry, with a first request, second media asset information for the second time period from the database in response to determining that the user is likely to use the user device during the second time period;
      store, using the storage circuitry, while first media asset information for the first time period is displayed, the requested second media asset information in a cache;
      receive a second request for the requested second media asset information; and
      retrieve the requested second media asset information from the cache in response to receiving the second request.

12. The system of claim 11, wherein the control circuitry is further configured to request third media asset information for a third time period from the database in response to the requested second media asset information being retrieved, and wherein the third time period succeeds the second time period in time order.

13. The system of claim 11, wherein the first media asset information comprises a first media asset identifier, and wherein the second media asset information comprises a second media asset identifier.

14. The system of claim 13, wherein the first media asset identifier is a first program identifier, and wherein the second media asset identifier is a second program identifier.

15. The system of claim 11, wherein the control circuitry is further configured to receive an indication from the user device to retrieve the requested second media asset information.

16. The system of claim 15, wherein the received indication is based on a user selection of a selectable identifier, and wherein the selectable identifier corresponds to a specific media asset identifier corresponding to the second media asset information.

17. The system of claim 15, wherein the received indication is based on the first media asset information being displayed for a threshold period of time.

18. The system of claim 11, wherein the user profile is, at least in part, manually generated.

19. The system of claim 11, wherein the user profile is, at least in part, automatically generated by the control circuitry.

20. The system of claim 11, wherein the user profile reflects times and days that the user is likely to use the user device.

* * * * *